Aug. 28, 1928.
L. LEVIEN
1,682,048
RECEPTACLE AND HANDLE THEREFOR
Filed Aug. 24, 1927
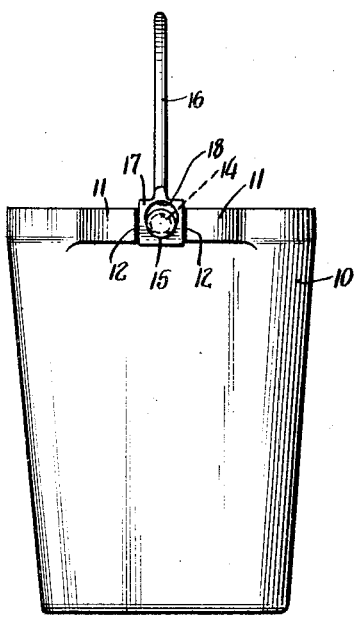
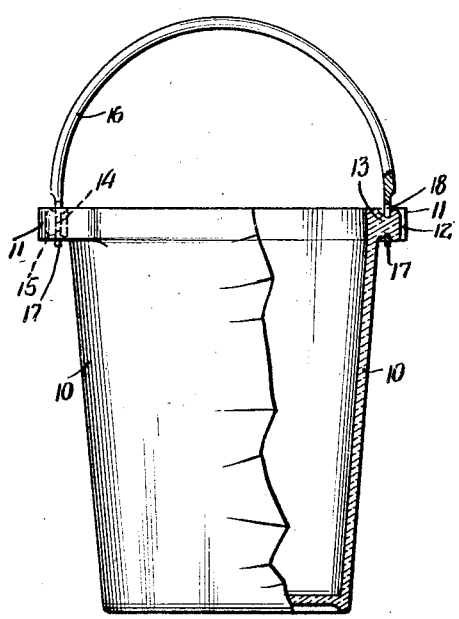
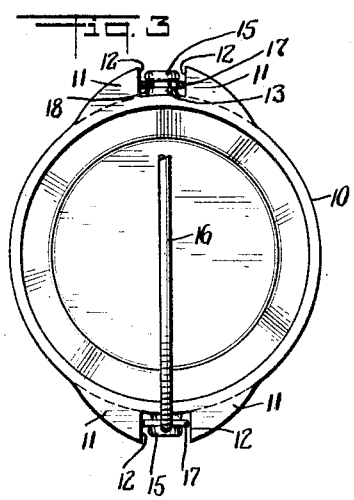
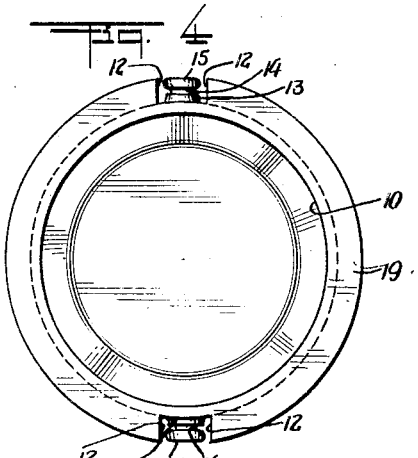
INVENTOR
Louis Levien
BY
ATTORNEYS Patented Aug. 28, 1928.

1,682,048

UNITED STATES PATENT OFFICE.

LOUIS LEVIEN, OF NEW YORK, N. Y.

RECEPTACLE AND HANDLE THEREFOR.

Application filed August 24, 1927. Serial No. 215,162.

My invention relates to a new and improved receptacle and handle therefor.

One of the objects of my invention is to provide a new and improved combination receptacle or bucket made of glass and a detachable resilient handle therefor.

Another object of my invention is to provide a device which shall be of great simplicity and which can be readily and easily manufactured and assembled.

Other objects of my invention will be set forth in the following description and drawings which illustrate a preferred embodiment thereof, it being understood that the above general statement of the objects of my invention is intended merely to generally explain the same and not to limit it in any manner.

Fig. 1 is an elevation.

Fig. 2 is an elevation partially in section, this view being taken at right angles to Fig. 1.

Fig. 3 is a top view of Fig. 1.

Fig. 4 is a top view of a different embodiment of the receptacle or bucket, the handle being shown removed.

Heretofore receptacles such as baskets, bonbon dishes, ice pails etc. have been combined with handles in various ways but the construction was fragile and inconvenient to ship and pack.

According to my invention the receptacle 10 is provided with two pairs of tapered extensions or lugs 11, each lug of one of said pairs being respectively opposite a corresponding lug of the other of said pairs. These lugs, being molded integral with the receptacle, and having substantial strength, protect the more fragile members 15 against breakage. For example, in Fig. 4, the top outer flange of the receptacle is continuously circular.

Holding lugs 15 having circumferential recesses 14 and base portions 13 are also provided, these members 15 being also preferably integral with the body of the receptacle 10. The handle 16 is preferably made of resilient metal or other resilient material and it is provided with flattened ends 17 having openings 18 so that the holding lugs 15 can be passed through the said openings 18. The walls of the said openings 18 are adapted to engage the recesses 14 of the holding lugs 15.

The said enlarged flat ends 17 fit between the walls 12 of the tapered projections 11.

The distance between the ends 17 of the handle 16 is normally less than the distance between the respective recesses 14 of the holding projection 15. Hence, when the lug 15 is moved into the position shown in Fig. 2, the resilience of the handle 16 forces the said flattened ends 17 towards each other or inwardly so that a reliable and positive engagement between the ends of the handle and the recessed members 15 is provided at all times.

It is obvious that the handle 16 can be readily attached and detached so that it is much more convenient to pack, ship and store these devices.

I have shown a preferred embodiment of my invention, but it is clear that numerous changes and omissions could be made without departing from its spirit.

I claim:—

1. A glass receptacle having two pairs of tapered projections integral therewith, holding projections integral with said receptacle and located in the spaces between said tapered projections and substantially flush with the outer surface of said tapered projections, and a handle made of resilient material having perforated ends adapted to engage said recesses.

2. A glass receptacle having holding lugs formed integrally therein on the outside and near the top of said receptacle, the mouth of said receptacle being molded so as to have a protecting portion on the periphery thereof, the outer surface of which is substantially flush with the outer surface of said lugs so as to protect said lugs from breakage.

In testimony whereof I affix my signature.

LOUIS LEVIEN.